US007222821B2

(12) United States Patent
Matos et al.

(10) Patent No.: US 7,222,821 B2
(45) Date of Patent: May 29, 2007

(54) METHOD AND APPARATUS FOR TREATING FUEL TO TEMPORARILY REDUCE ITS COMBUSTIBILITY

(76) Inventors: Jeffrey A. Matos, 132 Hillandale Dr., New Rochelle, NY (US) 10804; Karl F. Milde, Jr., 752 Union Valley Rd., Mahopac, NY (US) 10541

( * ) Notice: Subject to any disclaimer, the term of this patent is extended or adjusted under 35 U.S.C. 154(b) by 452 days.

(21) Appl. No.: 10/302,260

(22) Filed: Nov. 21, 2002

(65) Prior Publication Data
US 2003/0094543 A1     May 22, 2003

Related U.S. Application Data

(60) Provisional application No. 60/331,881, filed on Nov. 21, 2001.

(51) Int. Cl.
*B64D 37/02*     (2006.01)
(52) U.S. Cl. .................................................. 244/135 R
(58) Field of Classification Search ............ 244/135 R, 244/135 A, 135 B, 135 C, 136, 137.1; 169/53; 239/171; 220/4.15
See application file for complete search history.

(56) References Cited

U.S. PATENT DOCUMENTS

| 1,855,308 | A | * | 4/1932 | Niven ........................ 123/556 |
| 2,938,576 | A | * | 5/1960 | Cox et al. .................... 137/209 |
| 2,983,405 | A | * | 5/1961 | Tayler ........................ 220/88.3 |
| 3,229,446 | A | * | 1/1966 | Sebastian et al. ............. 95/265 |
| 3,467,349 | A | * | 9/1969 | Gautier .................... 244/135 R |
| 3,628,758 | A | * | 12/1971 | Nichols .................. 244/135 R |
| 3,788,039 | A | * | 1/1974 | Bragg .......................... 96/174 |
| 3,986,560 | A | * | 10/1976 | Heath et al. ................... 169/61 |
| 4,505,124 | A | * | 3/1985 | Mayer ......................... 62/180 |
| 4,522,158 | A | * | 6/1985 | Wisegerber .................. 123/1 A |
| 5,470,802 | A | | 11/1995 | Gnade et al. |
| 5,494,858 | A | | 2/1996 | Gnade et al. |
| 5,504,042 | A | | 4/1996 | Cho et al. |
| 5,523,615 | A | | 6/1996 | Cho et al. |
| 5,531,290 | A | * | 7/1996 | Furuichi et al. ............ 180/271 |
| 5,561,318 | A | | 10/1996 | Gnade et al. |
| 5,680,713 | A | | 10/1997 | Forbert et al. |
| 5,723,368 | A | | 3/1998 | Cho et al. |
| 5,736,425 | A | | 4/1998 | Smith et al. |
| 5,744,118 | A | | 4/1998 | Beadle |
| 5,750,415 | A | | 5/1998 | Gnade et al. |
| 5,753,305 | A | | 5/1998 | Smith et al. |

(Continued)

OTHER PUBLICATIONS www.answers.com, "tetaethyl lead", pp. 1-5.*

(Continued)

*Primary Examiner*—Teri Pham Luu
*Assistant Examiner*—Stephen A. Holzen
(74) *Attorney, Agent, or Firm*—Milde & Hoffberg, LLP

(57) ABSTRACT

A method and apparatus are disclosed for treating fuel to temporarily reduce its combustibility, and thereafter restore its combustibility. As used in an aircraft, the method comprises the following steps:
(a) treating aircraft engine fuel to substantially reduce its combustibility in open air;
(b) carrying the treated fuel in a fuel tank of an aircraft;
(c) increasing the combustibility of a portion of the treated fuel, as needed by the aircraft engine; and
(d) supplying the increased restored combustibility fuel to the aircraft engine.

Using this method, the preponderance of the fuel on board the aircraft is maintained at low combustibility for safety.

14 Claims, 4 Drawing Sheets

U.S. PATENT DOCUMENTS

| | | | |
|---|---|---|---|
| 5,788,950 A | 8/1998 | Imamura et al. | |
| 5,789,819 A | 8/1998 | Gnade et al. | |
| 5,795,556 A | 8/1998 | Jansen et al. | |
| 5,804,508 A | 9/1998 | Gnade et al. | |
| 5,807,494 A | 9/1998 | Boes et al. | |
| 5,807,607 A | 9/1998 | Smith et al. | |
| 5,847,443 A | 12/1998 | Cho et al. | |
| 5,877,100 A | 3/1999 | Smith et al. | |
| 5,928,723 A | 7/1999 | Koehlert et al. | |
| 5,955,140 A | 9/1999 | Smith et al. | |
| 5,972,826 A | 10/1999 | Boes et al. | |
| 6,010,762 A | 1/2000 | Smith et al. | |
| 6,022,812 A | 2/2000 | Smith et al. | |
| 6,024,074 A | 2/2000 | Koethe | |
| 6,037,275 A | 3/2000 | Wu et al. | |
| 6,037,277 A | 3/2000 | Masakarä et al. | |
| 6,048,804 A | 4/2000 | Smith et al. | |
| 6,063,714 A | 5/2000 | Smith et al. | |
| 6,090,439 A | 7/2000 | Menon et al. | |
| 6,090,448 A | 7/2000 | Wallace et al. | |
| 6,099,749 A | 8/2000 | Boes et al. | |
| 6,107,350 A | 8/2000 | Boes et al. | |
| 6,130,152 A | 10/2000 | Smith et al. | |
| 6,131,305 A | 10/2000 | Forbert et al. | |
| 6,132,837 A | 10/2000 | Boes et al. | |
| 6,140,254 A | 10/2000 | Endisch et al. | |
| 6,159,295 A | 12/2000 | Maskara et al. | |
| 6,159,540 A | 12/2000 | Menon et al. | |
| 6,171,645 B1 | 1/2001 | Smith et al. | |
| 6,172,120 B1 | 1/2001 | Smith et al. | |
| 6,174,926 B1 | 1/2001 | Menon et al. | |
| 6,208,014 B1 | 3/2001 | Wu et al. | |
| 6,315,971 B1 | 11/2001 | Wallace et al. | |
| 6,318,124 B1 | 11/2001 | Rutherford et al. | |
| 6,319,852 B1 | 11/2001 | Smith et al. | |
| 6,319,855 B1 | 11/2001 | Hendricks et al. | |
| 6,360,730 B1 * | 3/2002 | Koethe | 123/541 |

OTHER PUBLICATIONS

"Fuel Tank Ignition Prevention Measures." Federal Register Environmental Documents vol. 62. No. 6403 Apr. 1-21, 1997. Jul. 31, 2006 <http://www.epa.gov/docs/fedrgstr/EPA-GENERAL/1997/April/Day-03/g8495.htm>.*

Silica Aerogels, Ernest Orlando, Lawrence Berkeley National Laboratory (web site).

Charles F. Kettering and the 1921 Discovery of Tetraethyl Lead, by Bill Kovarik (web site).

Columbia Encyclopedia, 6th Ed. (2001) "Tetraethyl Lead".

Separation Methods in Biochemistry, by C.J. Morris & P. Morris; John Wiley & Sons, New York; pp. 188-193; 207-211; 236-237; 380-382.

Aerogel Materials and Tungsten Engineered Materials, by Marketech International, Inc. (web site).

* cited by examiner

METHOD AND APPARATUS FOR TREATING FUEL TO TEMPORARILY REDUCE ITS COMBUSTIBILITY

CROSS-REFERENCE TO RELATED APPLICATION

This application claims priority from applicants' prior Provisional Application Ser. No. 60/331,881, filed Nov. 21, 2001, entitled "METHOD AND APPARATUS FOR TREATING AIRCRAFT FUEL TO REDUCE ITS COMBUSTIBILITY IN FLIGHT".

BACKGROUND OF THE INVENTION

The present invention relates to a method and apparatus for treating liquid fuel to temporarily reduce its combustibility. In a preferred embodiment, the present invention relates to a system for treating fuel on board an aircraft, to improve the margin of safety in the event of an aircraft accident.

Aircraft accidents are very difficult to survive. Not only does such an accident result in a rapid deceleration at the moment of impact, but, subsequent to impact, loss of life occurs due to smoke inhalation and burning, because of the fire which almost inevitably follows.

Following an aircraft accident, it is imperative that any crew or passengers which remain conscious immediately exit the craft. The time available for such an emergency evacuation varies, but usually only a few minutes, if any, are available before the fuel carried on board the aircraft commences burning and in some cases, explodes.

SUMMARY OF THE INVENTION

It is a principal object of the present invention to provide a method and apparatus for treating liquid fuel to substantially reduce its combustibility, for example when the fuel is to be stored, and to thereafter restore its combustibility.

It is a subsidiary object of the present invention to increase the time available for survivors of an aircraft accident to exit the aircraft, before the craft is enveloped in flames, and to decrease the likelihood that an uncontrolled (or uncontrollable) fire will occur.

This object, as well as other objects which will become apparent from the discussion that follows, are achieved, in accordance with the present invention, by treating the fuel in such a way as to substantially reduce its combustibility in the fuel tank and/or in open air. The combustibility of a small portion of the treated fuel is later restored (at least to some degree) to its pretreatment value, as such fuel is needed. For example, in the case of aircraft, this higher (i.e., normal) combustibility fuel is supplied to the aircraft engine(s).

Since the preponderance of the fuel on board an aircraft is maintained with a low combustibility, the time for evacuation and escape from a crashed aircraft is markedly increased and the likelihood of fire is decreased.

In a preferred embodiment of the invention, the combustibility of the aircraft engine fuel is reduced, by cooling the fuel as a liquid to within about 40° C., and preferably to about 25° C. or even about 10° C., above its freezing point. Experiments have shown that liquid fuel which is cooled to within this range of temperatures has its combustibility remarkably reduced.

In another preferred embodiment of the present invention, the combustibility of the fuel is reduced by freezing it and maintaining the fuel, on board the aircraft, at a temperature at or below its freezing point. The fuel may be cooled to a temperature much lower than its freezing point; i.e., to 15° C. or even 25° C. or more below the freezing point.

Once the fuel is cooled as a liquid to near freezing temperature, or cooled to a temperature at or below freezing, a portion of the fuel must be warmed, as needed by the aircraft engine(s).

The freezing point of aviation jet fuel lies in the range of about −40° C. to about −65° C. This range was determined by an "Aviation Turbine Fuel Freezing Point Survey" conducted by Francis Davidson and Dr. Gordon Chiu of Phase Technology, 11168 Hammersmith Gate, Richmond, BC, V7A 5H8, Canada.

Techniques for refrigerating and freezing liquids, having freezing points in the range of −40° C. to −65° C. are well known. For example, liquid nitrogen, which is stored under pressure at about −200° C. and is commercially available in large quantities, at a cost of about $50 per ton, may be used as a heat exchange fluid. Other cryogenic fluids or solids, such as carbon dioxide, may also be used.

Also known are various techniques for determining the phase transition point and phase transition temperature of fuel. See, e.g., U.S. Pat. No. 4,804,274 to Green.

In still another embodiment of the present invention, the combustibility of the fuel is reduced by adding to it a first chemical composition. Thereafter, just before the fuel is used, a portion of this fuel is treated by either removing the first chemical composition or by adding a second chemical composition thereto. The combustibility of this portion of the fuel is thereby restored, or at least increased, before the fuel is converted into energy, for example by the aircraft engine.

There are a number of chemical compositions which may serve to reduce the combustibility of fuel. These may be classified as an anti-detonative agent, a polymer agent, a gelling agent, a "soap" and, finally, a bonding agent.

The anti-detonative ("anti-knocking") agents may be lead based, such as tetra-alkyl lead, tetra-ethyl lead, tetra-methyl lead; tin-based, such as tetra-ethyl tin; iron-based, such as iron carbonyl; iodine-based, such as elemental iodine; carbon-based, such as aniline; aluminum-based; silicon-based; germanium-based; nitrogen-based, such as an amine; phosphorus-based; arsenic-based; sulfur-based; selenium-based; tellurium-based; bromine-based; chromium-based; molybdenum-based; tungsten-based; manganese-based; osmium-based; organic-based; nickel-based; palladium-based or platinum-based.

Where the first chemical composition is a polymer, the polymer may be polystyrene; made from a monomer which is an alkene, such as a heptene (e.g. 1-heptene), an octene (e.g. 1-octene), a nonene (e.g. 1-nonene), a decene (e.g. 1-decene); or an alkene which has more than ten carbon atoms.

In the case where the first chemical composition is a gelling agent, the chemical composition may form a colloid with the fuel, or form a gel. In the case of the gelling agent, the gel may be silicon-based, such as treated silica. The gel may be a silica aerogel which has been subject to derivitization or which has been organically modified. The aerogel is preferably a hydrophobic silica aerogel. Where the aerogel has been subject to derivitization, this derivitization may consist of linking trialkylsilyl groups to the surface hydroxyl groups. The trialkylsilyl groups may be trimethylsilyl groups. In the case where the silica aerogel has been organically modified, the modification may consist of replacing the surface hydroxyl groups with alkoxy groups or consist of linking an organometallic compound to the surface hydroxyl groups.

In the case where the first composition is a "soap", the composition may be a salt of an organic acid, such as an aluminum salt of an organic acid. The chemical composition may also be a salt of a long chain organic acid, such as an organic acid with five to ten carbon atoms, ten to fifteen carbon atoms, fifteen to twenty carbon atoms or more than twenty carbon atoms. The chemical composition may be a salt of an aromatic organic acid such as naphthenic acid. Also the chemical composition may be a mixture of two or more salts of organic acids.

In the case where the first chemical composition is a bonding agent, it may consist of a polymer bonded to inner surfaces of the fuel tank, including the inner walls of the tank and/or additional surfaces on plates and the like which have been incorporated into the fuel tank. Alternatively, the polymer may be bonded to small beads, such as beads which are less than one centimeter in diameter, less than one millimeter in diameter or even less than one micron in diameter.

In the case where the first chemical composition is a gel, the gel may be bonded to inner surfaces of the fuel tank, including the inner walls of the tank and/or the surfaces of plates or the like which have been incorporated into the fuel tank. Alternatively, the gel may be bonded to small beads, such as beads having a diameter of less than one centimeter, less than one millimeter or even less than one micron.

In the case where the first composition is a polymer or a gel, the combustibility of the fuel may be restored by filtration, to eliminate the effects of this polymer or gel.

In the case where the polymer or gel is bonded to small beads, the beads themselves, with their bonding agent, may be removed by filtration.

Finally, the first composition may also be removed by electrodeposition, electrostatic deposition and/or electroprecipitation.

Finally, the combustibility of the fuel may be restored by adding a second chemical composition to a portion of the treated fuel as an "antidote" to the first composition.

DESCRIPTION OF THE PREFERRED EMBODIMENTS

Figure 1:
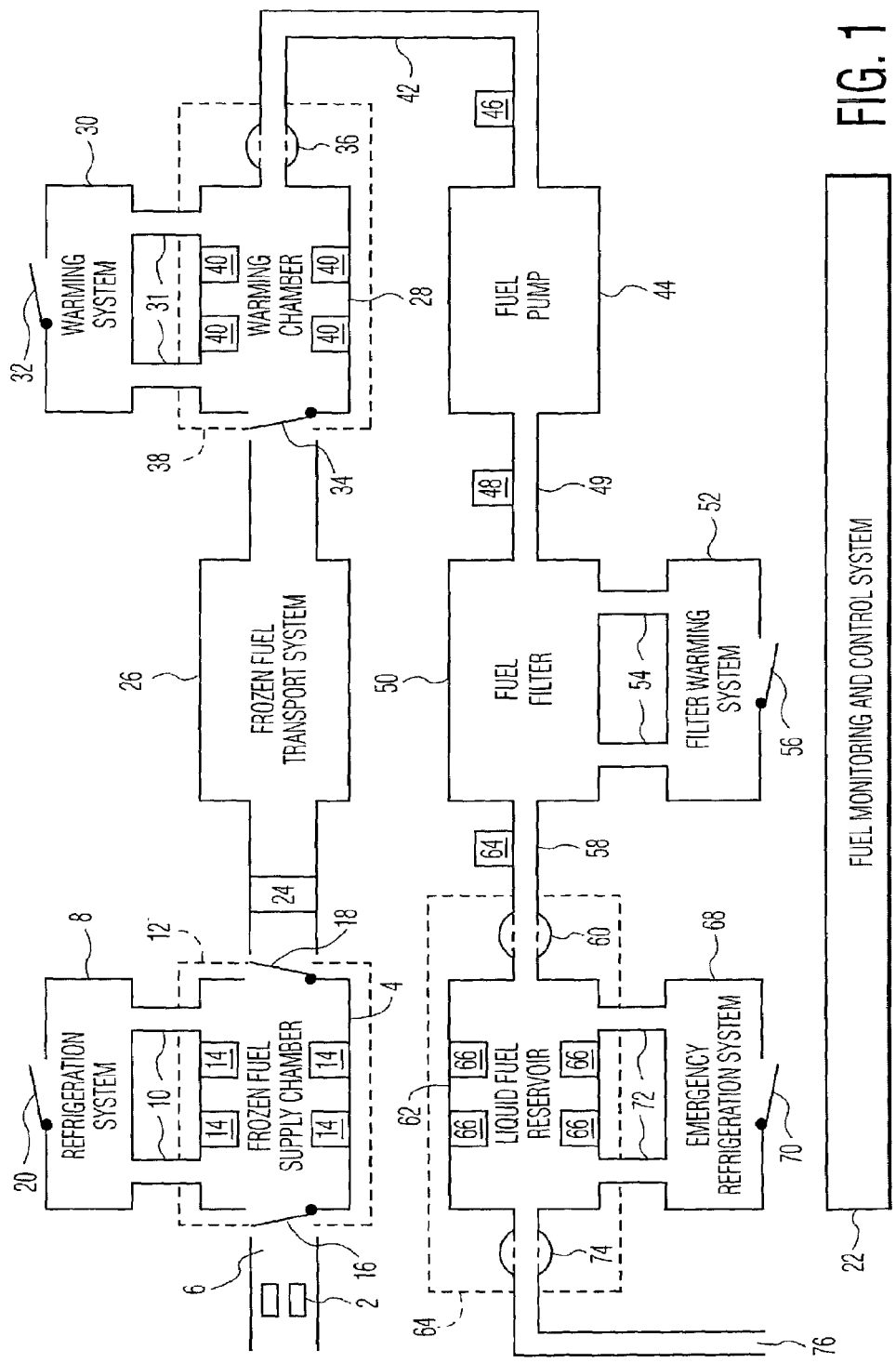
FIG. 1 is a block diagram of a system, according to a preferred embodiment of the present invention, for providing frozen fuel on board an aircraft, loaded on to the aircraft in frozen form.

The preferred embodiments of the present invention will now be described with reference to FIGS. 1-4 of the drawings.

Identical elements in the various figures are designated with the same reference numerals.

FIG. 1 shows an embodiment of the invention in which frozen fuel is loaded onto the aircraft. Frozen fuel 2 enters the frozen fuel supply chamber 4 through inlet 6. A refrigeration system 8 maintains the proper temperature in frozen fuel supply chamber 4 via cooling ports 10. The frozen fuel supply chamber is insulated with insulating material 12. Temperature and fuel phase, as well as other characteristics such as viscosity, are monitored within the frozen fuel chamber 4 by monitoring elements 14 which, in the case of temperature may be thermistor-based, thermocouple-based, or other technology, and in the case of phase monitoring may consist of optical density/turbidity monitoring, ultrasound monitoring to look for liquid/solid boundaries, or other monitoring apparatus and associated transducers. Pre-flight, during aircraft fuel loading, frozen fuel intake port 16 is maintained in the open position. At all other times it is sealed. During flight, frozen fuel outlet port 18 is open, unless a threat of crash or accident exists, in which case it may be sealed. Port 20 allows for the supply of refrigerant. The position of each of ports 16, 18, and 20 is monitored and controlled by fuel monitoring and control system 22. The fuel monitoring and control system 22 also monitors the temperature and phase information from monitoring elements 14, and uses this information to control refrigeration system 8 to maintain the proper temperature in frozen fuel supply chamber 4. Most of the fuel carried by the aircraft is maintained in the frozen state. The amount of liquid fuel is maintained at a minimum which, nevertheless, is sufficient to meet the demands of each segment of the flight.

Frozen fuel leaves the supply chamber 4 and passes through a cutting/shaping apparatus 24. This may shave slices off of a bar of fuel, shave a ribbon off of a cylinder of fuel, or create pellets, blocks, strips or spheres of frozen fuel. The cut/shaped fuel is moved by frozen fuel transport system 26 which is controlled by control system 22. The rate of transport is determined by throttle position, pilot settings and other variables.

Frozen fuel then passes to warming chamber 28, where it is melted by warming system 30. The warming system has access to the warming chamber via ports 31. Warm gases or liquid may be supplied to the warming system via port 32. Alternatively, the system may provide electrical warming via current passing through a resistive element or heating by electromagnetic energy. If necessary, the warming chamber may be sealed by closing inlet door 34 and outlet valve 36. This chamber is insulated by insulating material 38. The temperature and phase (and possibly other characteristics) within the chamber are monitored by elements 40, which are analogous to but not necessarily the same type as elements 14 in the frozen fuel supply chamber 4. The relative degree of opening of each of ports 32 and 34 and valve 36 is monitored and controlled by fuel monitoring and control system 22. The fuel monitoring and control system 22 also monitors the temperature and phase information from monitoring elements 40, and uses this information to control warming system 30.

Liquified fuel leaves the warming chamber and passes successively through valve 36 and through fuel line 42 to fuel pump 44. Pressure and flow upstream and downstream from the fuel pump are monitored by sensors 46 and 48, Information from these sensors is monitored by fuel monitoring and control system 22, which also controls the fuel pump 44.

The fuel then passes through fuel line 49 to the fuel filter 50. To prevent clogging by ice or remaining frozen fuel, the filter is equipped with a warming system 52, which is controlled by fuel monitoring and control system 22. The warming system has access to the filter via ports 54. Warm gases or liquid may be supplied to the filter warming system 52 via port 56. Alternatively, this warming system may be electrically powered by an electric current passing through a resistive element or by electromagnetic energy. The position of port 56 is monitored and controlled by fuel monitoring and control system 22.

The liquid fuel then passes successively through fuel line 58, and intake valve 60 into the liquid fuel reservoir 62. Pressure and flow within fuel line 58 are monitored by sensor 64 which sends information to fuel monitoring and control system 22. The liquid fuel reservoir 62 is insulated by insulating material 64. Temperature and phase (or other characteristics) within this reservoir are monitored by elements 66 which are analogous but not necessarily the same as elements 14. These elements send their information to fuel monitoring and control system 22. Access to this reservoir is controlled by inlet valve 60 and outlet valve 74. In the event of emergency such as impending crash, this chamber may be sealed by closing these valves. The positions of these valves are monitored and controlled by fuel monitoring and control system 22. Also, in the event of impending crash, the liquid fuel in reservoir 62 may be rapidly cooled or frozen by emergency refrigeration system 68, which has access to the liquid fuel reservoir 62 by ports 72. Port 70 allows for the supply of refrigerant to emergency refrigeration system 68. The emergency refrigeration system 68 is controlled and monitored by fuel monitoring and control system 22.

Liquid fuel passes out of reservoir 62 through valve 74 into fuel line 76, and flows through the fuel supply system that is in common use for the aircraft.

Figure 2:
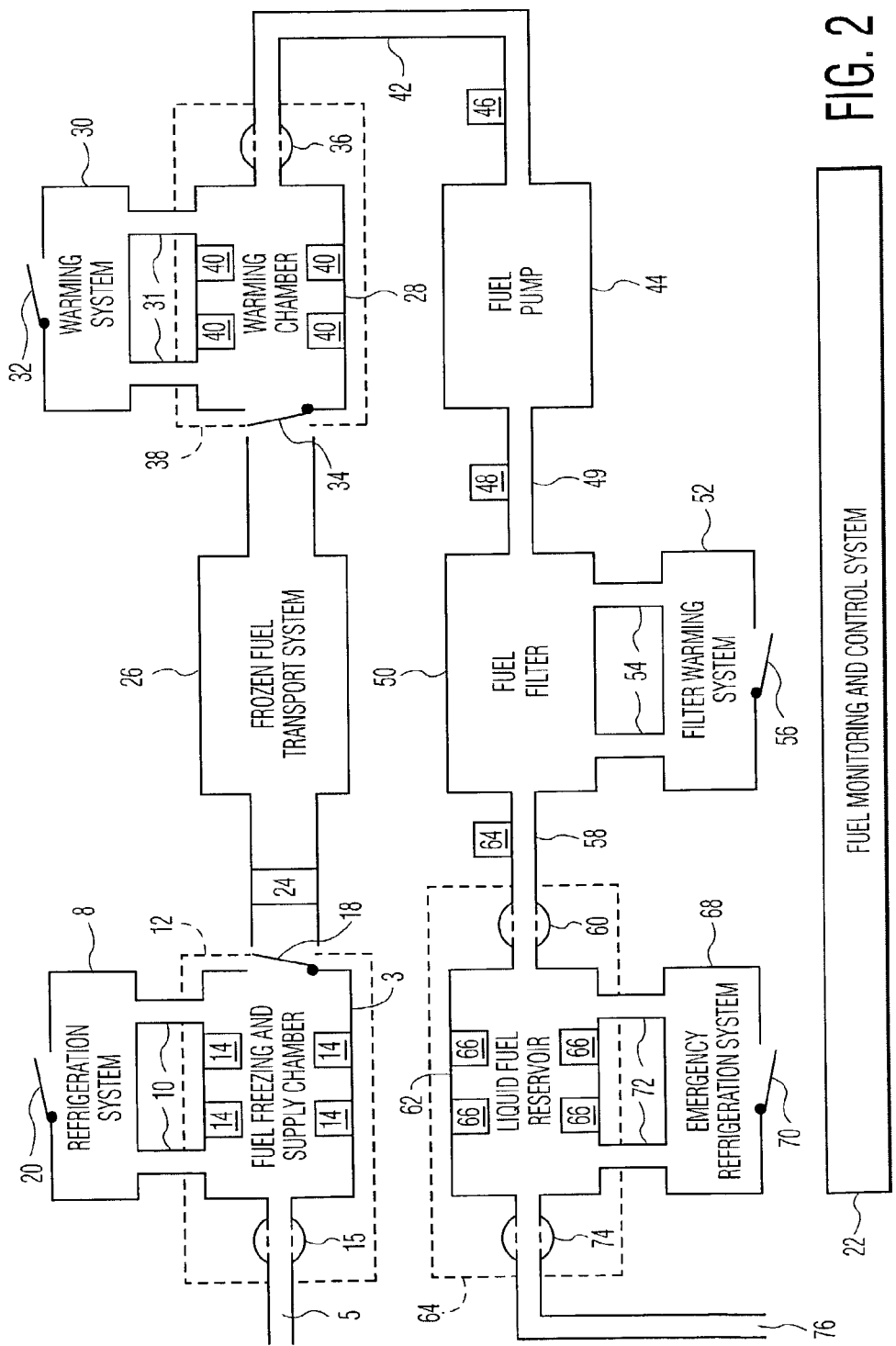
FIG. 2 is a block diagram of a system, according to a preferred embodiment of the present invention, for providing frozen fuel on board an aircraft, loaded on to the aircraft in liquid form.

FIG. 2 shows an embodiment of the invention in which liquid fuel is loaded onto the aircraft. The liquid fuel is then frozen. Liquid fuel enters the fuel freezing and supply chamber 3 after passing successively through intake pipe 5 and intake valve 15. Pre-flight, during aircraft fuel loading, intake valve 15 is maintained in the open position. At all other times it is closed. The position of intake valve 15 is monitored and controlled by fuel monitoring and control system 22. After entering the fuel freezing and supply chamber 3 in liquid form, the fuel is frozen in this chamber by refrigeration system 8. Thereafter, chamber 3 serves as a frozen fuel supply chamber, analogous in function to the frozen fuel supply chamber 4, described in FIG. 1. All other components and operations of FIG. 2 are the same as those shown in FIG. 1.

Although FIG. 1 and FIG. 2 show a single fuel pump and filter, clearly multiple fuel pumps and/or fuel filters may be provided.

Figure 3:
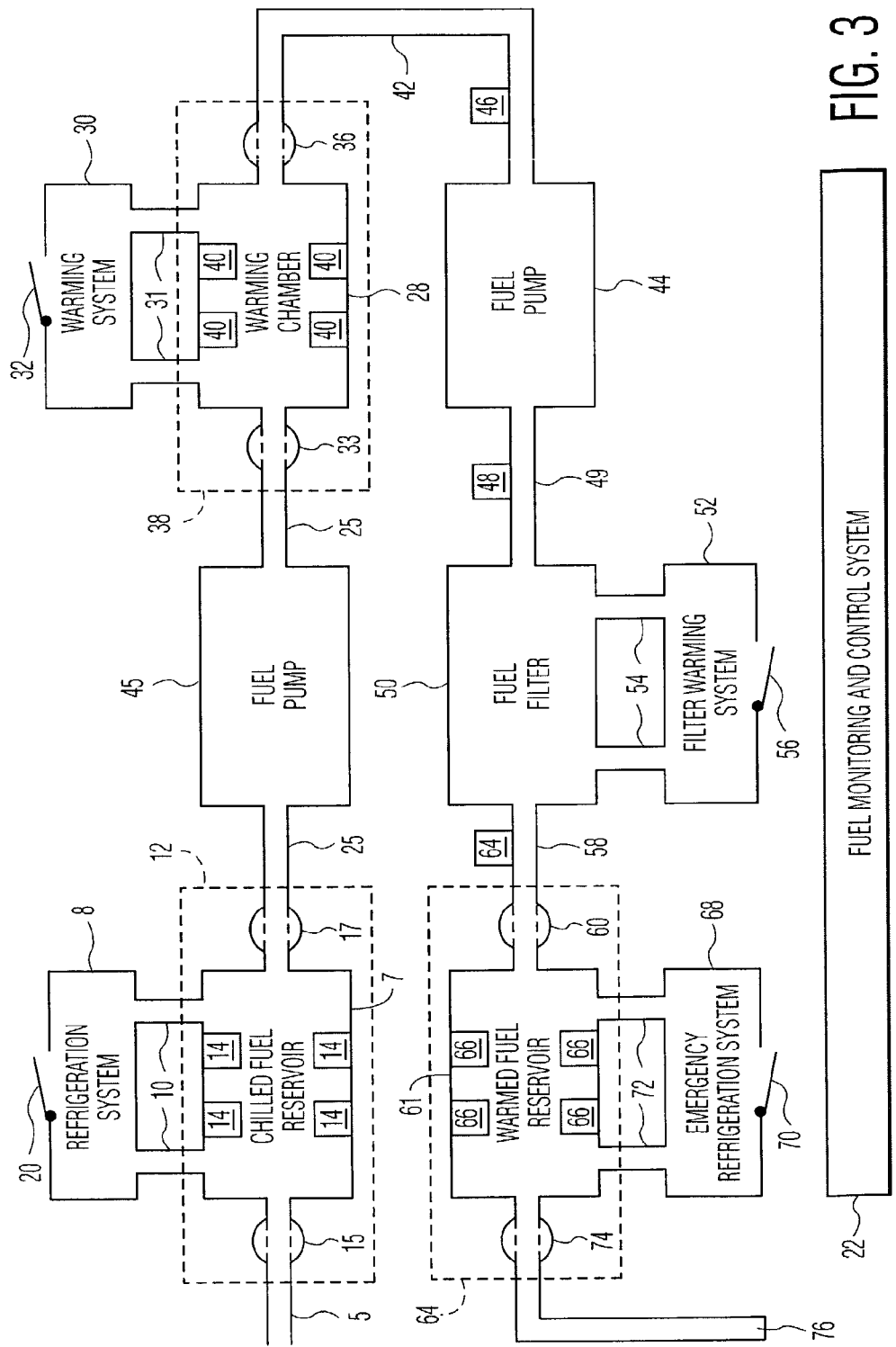
FIG. 3 is a block diagram of a system, according to another preferred embodiment of the present invention, for providing chilled liquid fuel on board an aircraft.

FIG. 3 shows an embodiment of the invention in which liquid fuel is loaded onto the aircraft. The liquid fuel is then chilled but not frozen. Liquid fuel enters the chilled fuel reservoir 7 after passing successively through intake pipe 5 and intake valve 15. A refrigeration system 8 maintains the proper temperature in the chilled fuel reservoir 7 via cooling ports 10. Pre-flight, during aircraft fuel loading, intake valve 15 is maintained in the open position. At all other times it is closed. During flight, chilled fuel reservoir outlet valve 17 is open, unless a threat of crash or accident exists, in which case it may be closed. The position of each of valves 15 and 17 is monitored and controlled by fuel monitoring and control system 22.

Chilled, but not frozen fuel leaves the reservoir 7 and passes through valve 17 into fuel supply line 25. It then is pumped by fuel pump 45, after which it passes through another segment of fuel supply line 25. Pressure and flow may be monitored within each of supply lines 25, and this information is supplied to fuel monitor and control system 22. Fuel then passes through warming chamber intake valve 33 and enters the warming chamber. It leaves this chamber through warming chamber outlet valve 36. If necessary, this chamber may be sealed by closing valves 33 and 36. The position of valves 33 and 36 is monitored and controlled by fuel monitoring and control system 22.

After passing through fuel line 42, fuel pump 44, fuel line 49, fuel filter 50 and intake valve 60, the warmed fuel enters warmed fuel reservoir 61. All other components and operations of FIG. 3 are the same as those shown in FIG. 1.

Whereas FIG. 3 shows two fuel pumps and one filter, clearly a greater (or lower) number of pumps and/or a greater number of filters may be provided.

Figure 4:
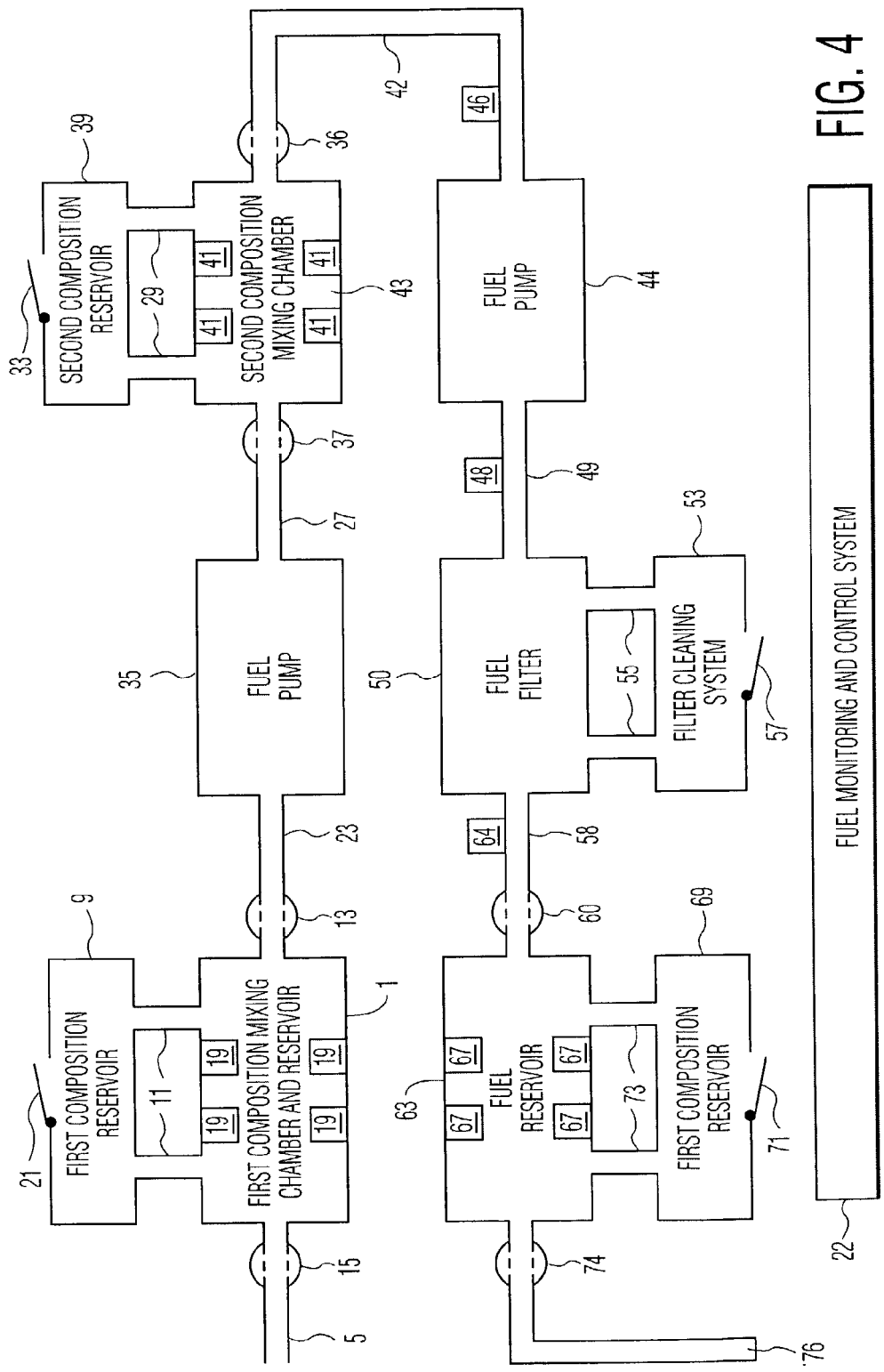
FIG. 4 is a block diagram of a system, according to still another preferred embodiment of the present invention, for providing a chemical additive to the fuel on board an aircraft to reduce the combustibility of the fuel.

FIG. 4 shows an embodiment of the invention in which a first composition is added to the fuel in order to decrease its combustibility and, thereafter, a second composition is added to a portion of the fuel, as needed by the aircraft engine, to at least substantially restore it to its original combustibility.

Fuel enters the first composition mixing chamber and reservoir 1 through supply line 5 and inlet valve 15. First composition enters chamber 1 through first composition supply lines 11. The first composition is stored in reservoir 9 which is filled through inlet port 21. The properties of the mixture of fuel and the first composition, including temperature, infrared, optical and ultraviolet spectroscopy and ultrasound reflection and transmission may be monitored by sensors and transducers 19. Pre-flight, during aircraft fuel loading, valve 15 is maintained in the open position. At all other times, it is closed. During flight, valve 13 is open, unless a threat of crash or accident exists, in which case it may be closed. Supply port 21 allows for loading first composition into its reservoir 9. The position of each of valves 13 and 15 and supply port 21 is monitored and controlled by fuel monitoring and control system 22. The fuel monitoring and control system 22 also monitors the information from sensors 19 and uses this information to control the amount of first composition to be released from reservoir 9 through supply lines 11 into first composition mixing chamber and reservoir 1. Most of the fuel carried by the aircraft is maintained as a mixture with the first composition.

Chemically stabilized fuel leaves chamber 1 passes through outlet valve 13 and through fuel line 23. It is then pumped by fuel pump 35, into fuel line 27, through valve 37 into second composition mixing chamber 43. Pressure and flow may be monitored in each of supply lines 23 and 27, and this information is supplied to fuel monitoring and control system 22. Pump 35 is controlled by control system 22. The flow rate is determined by throttle position, pilot settings and other variables.

Stabilized fuel is mixed with second composition to reverse the stabilizing effect of first composition. The mixing with second composition occurs in second composition mixing chamber 43. Second composition is stored in reservoir 39 which is filled through supply port 33. Second composition enters the second composition mixing chamber 43, through inlet ports 29. The properties and composition of the mixture in chamber 43 are monitored by sensors and transducers 41, which operate in a manner analogous to sensors and transducers 19. Fuel monitoring and control system 22 monitors the information from these sensors 41 and uses the information to control the amount of second composition which is added. The positions of valves 37 and 36 are monitored and controlled by fuel monitoring and control system 22.

Treated fuel leaves second composition mixing chamber 43, passes through valve 36 and supply line 42, is pumped by fuel pump 44, enters fuel line 49, and passes through the fuel filter 50. The filter is linked to a filter cleaning system 53, which either continuously and/or intermittently cleans and/or resupplies the filtering material. The filter cleaning system has access to the filter through ports 55. Filtering and cleaning agents may be supplied and removed through supply port 57.

An alternative to the addition of second composition to reverse the effect of first composition is to filter out the first composition. In such an embodiment, the second composition reservoir, mixing chamber and associated ports and valves would be eliminated, as would fuel pump 35 and its associated supply line. In this embodiment, treated fuel would pass directly from valve 13 and fuel line 23 to the fuel line 42. In this embodiment, the first composition would be removed by fuel filter 50.

The pressure and flow rate within the fuel supply lines is monitored by sensors 46, 48, and 64, which send information to the fuel monitoring and control system 22.

Fuel leaves the filter 50 and passes through supply line 58, through valve 60 into the fuel reservoir 63. The temperature, composition and other properties of the fuel in this chamber are monitored by sensors and transducers 67 which are linked to fuel monitoring and control system 22. At any time, only a minority of the fuel is maintained in fuel reservoir 63, since the combustibility of this fuel is greater than that in first composition mixing chamber and reservoir 1.

Fuel leaves reservoir 63 passes through valve 74 into fuel line 76 and flows through the fuel supply system that is in common use for the aircraft.

Whereas FIG. 4 shows two fuel pumps and one filter, clearly a greater (or lower) number of pumps and/or a greater number of filters may be provided.

In the event of anticipated crash, an additional supply of first composition is situated in reservoir 69. It could be rapidly added to the fuel in reservoir 63 to stabilize it, through inlet ports 73. First composition is supplied to reservoir 69 through supply port 71.

Examples of both the first and the second chemical compositions are discussed above in the "Summary of the Invention". Such compositions are well known as evidenced by the various U.S. patents and publications, the following of which are incorporated herein by reference:

U.S. Pat. Nos. 6,319,855
6,319,852
6,318,124
6,315,971
6,208,014
6,174,926
6,172,120
6,171,645
6,159,540
6,159,295
6,140,254
6,132,837
6,131,305
6,130,152
6,107,350
6,099,749
6,090,448
6,090,439
6,063,714
6,048,804
6,037,277
6,037,275
6,022,812
6,010,762
5,972,826
5,955,140
5,807,494
5,928,723
5,877,100
5,847,443
5,807,607
5,804,508
5,795,556
5,789,819
5,788,950
5,753,305
5,750,415
5,744,118
5,736,425
5,723,368
5,680,713
5,561,318
5,523,615
5,504,042
5,494,858
5,470,802

*Silica Aerogels*, Ernest Orlando, Lawrence Berkeley National Laboratory (web site).

*Charles F. Kettering and the* 1921 *Discovery of Tetraethyl Lead*, by Bill Kovarik (web site).

*Columbia Encyclopedia*, $6^{th}$ Ed. (2001): "Tetraethyl Lead".

*Separation Methods in Biochemistry*, by C. J. Morris and P. Morris; John Wiley & Sons, New York; pp 188-193; 207-211; 236-237; 380-382.

*Aerogel Materials and Tungsten Engineered Materials*, by Marketech International, Inc. (web site).

Options for cooling or freezing the fuel include refrigeration systems as are known in the art. Other options include the use of a liquified inert gas such as nitrogen, helium or other noble element. Yet another option is the use of carbon dioxide in either liquid form (under pressure) or solidified. The inert gases and carbon dioxide also have the advantages of fire retardation properties. They could, in the event of impending crash, be placed in close proximity to, or in direct contact with the fuel, as an additional combustion retardant.

Options for warming the fuel include a number of methods of exposure to a warm surface. The surface may be warmed by ambient air, by hot engine gases, or by hot engine oil. Alternatively, an electric current may be passed through a resistive element as a source of heat or the fuel may be warmed by electromagnetic energy.

Multiple options exist for distributing frozen fuel:

I) The entire quantity of fuel is stored as one (or a small number of) large block(s) of fuel:

A) Methods in which small pieces are not cut off of the large block:

i) An extrusion process: The frozen fuel is a waxy substance, which can be forced to change shape by pressure applied from the outside of its container. Pressure may be applied by a screw-type mechanism which forces waxy fuel from the larger end to the smaller end of a funnel-shaped segment. Such a mechanism would control the movement of frozen fuel from the supply chamber to the frozen fuel transport system. In addition, the funnel shaped segment could be warmed to facilitate passage of the fuel through the funnel segment.

ii) A length of fuel element is situated so that most of it is frozen. It may be shaped like a stick of butter. One end of the stick passes through a warming region (where warm is defined as a temperature above the freezing point of the fuel). Drops of liquid fuel fall from the melting fuel stick into a collector. The liquid fuel then moves through a fuel line to a liquid fuel reservoir.

iii) The fuel is frozen in large sheets, which are then rolled up like a roll of carpet. It could be loaded onto the aircraft as a roll, or could conceivably be unrolled from one container, passed into the aircraft as a wide ribbon of frozen fuel, and re-rolled as it is taken into the aircraft. During the flight, as fuel is needed, the roll is gradually unrolled, and a continuous ribbon of frozen fuel is supplied. It could be transported by a conveyor belt-like apparatus to a "distant" melting chamber, or melted nearer to the roll.

iv) The fuel is frozen into a string-like shape and rolled up like a ball of twine. There would be a similar unrolling process as in I(A)(iii), above.

B) Methods in which small pieces are cut off of the large block.

i) A guillotine-like apparatus cuts small slices of solid fuel off of a rectangular, margarine-stick shaped block of fuel. The slices fall onto a conveyor belt which transports the fuel to a melting chamber. The advantage of situating the melting chamber distant from the guillotine is the greater separation of the far more combustible liquid fuel from the less combustible solid fuel. Alternatively, rather than transporting the slices to a distant location, they could be melted near the cutting apparatus.

ii) Same concept as I(B)(i) but the frozen fuel element is cylindrical, rather than rectangular. Slicing is carried out perpendicularly to the central axis of symmetry of the cylinder.

C) Method in which one continuous piece is cut.

i) The fuel is cylindrical in shape. It rotates continuously about its central axis of symmetry. A cutting blade (like a cheese knife) is applied to the surface which cuts off a continuous ribbon of fuel. The fuel is processed as in I(A)(iii), above.

II) The fuel is stored as a large number of small pieces, to be used as needed:

A) The fuel is shaped in cubic or rectangular blocks. These are arranged in a 3 dimensional grid. A series of conveyor belts moves the fuel. There is one belt for each row, running right/left. This passes the fuel element to another conveyor belt, moving perpendicular to the right/left ones, i.e. front/back. Additional conveyor apparatus could allow for many layers of fuel elements to be built up (in the up/down direction).

B) The fuel could be loaded as spherical elements. The advantage of spherical elements is that they could roll over each other and roll on a smooth surface. They could then be pumped into the aircraft, and possibly "flow" or roll through a fuel line from storage tank to warmer. On the other hand, increased storage space would be required for a given amount of fuel, compared to storing cubic or rectangular blocks, which "fit together". Also, the greater surface area of spherical elements would mean increased combustibility, compared to cubic or rectangular elements. In general, the total fuel surface area (or more specifically the area to volume ratio or area to mass ratio) for any of the methods under II is greater than those involving fuel with similar shape and only a single (or small number of) fuel block(s), as in I. Spherical fuel elements have the least favorable surface area to volume ratio among those shapes discussed herein.

C) Same as II(B) but cylindrical elements are used. These can roll, though not as freely as the spherical ones. As compared with spherical elements, they have the advantages of less surface area and less lost storage volume.

D) The fuel is contained in hard/smooth-surfaced spherical shells with multiple holes. The advantage is that these can roll easily. The shells roll or are propelled to a warming chamber, where the fuel melts and drips out of the shell. The disadvantage of the approach is the waste of space, and that the shells add weight.

E) Same as II(D) but using cylindrical shells.

There has thus been shown and described a novel method and apparatus for treating fuel to temporarily reduce its combustibility which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of supplying liquid fuel to an engine of an aircraft, said method comprising the steps of:
    (a) treating aircraft engine fuel to substantially reduce its combustibility in open air;
    (b) carrying the treated fuel in a fuel tank of an aircraft in such a manner that its reduced combustibility is maintained;
    (c) increasing the combustibility of a portion of the treated fuel, as needed by the aircraft engine;
    (d) supplying the increased combustibility fuel to the aircraft engine; and
    (e) rapidly reducing the combustibility of said portion of the fuel during flight of the aircraft in case of an aircraft emergency;
    whereby the preponderance of the fuel on board the aircraft has a low combustibility, and the combustibility of the remaining portion of the fuel is reduced in the event of an aircraft emergency.

2. The method defined in claim 1, wherein in step (c) the combustibility of said portion of the fuel is restored to substantially the combustibility that the fuel had prior to its treatment in step (a).

3. The method defined in claim 1, wherein said step of rapidly cooling includes injecting a cooling liquid into said portion of fuel.

4. The method defined in claim 1, wherein the step of treating the aircraft fuel includes cooling the fuel to its freezing temperature or above, wherein the fuel remains a liquid.

5. The method defined in claim 1, wherein the step of treating the aircraft fuel includes cooling the fuel to a temperature between its freezing temperature and a temperature about 40° C. above its freezing temperature, wherein the fuel remains a liquid.

6. The method defined in claim 1, wherein the step of treating the aircraft fuel includes cooling the fuel to a temperature between its freezing temperature and a temperature about 25° C. above its freezing temperature, wherein the fuel remains a liquid.

7. The method defined in claim 1, wherein the step of treating the aircraft fuel includes cooling the fuel to a temperature between its freezing temperature and a temperature about 10° C. above its freezing temperature, wherein the fuel remains a liquid.

8. A method of supplying fuel to an engine of an aircraft, said method comprising the steps of:
  (a) loading the fuel on board the aircraft in the liquid state at a temperature between its freezing temperature and a temperature about 40° C. above its freezing temperature to reduce its combustibility wherein the fuel remains a liquid;
  (b) maintaining the fuel on board the aircraft at reduced temperature between its freezing temperature, and a temperature about 40° C. above its freezing temperature, to reduce its combustibility;
  (c) heating a portion of the cooled fuel, as needed by the aircraft engine;
  (d) supplying the heated fuel to the aircraft engine; and
  (e) rapidly cooling said portion of the fuel during flight of the aircraft to a reduced temperature sufficient to substantially reduce the combustibility of said portion of the fuel in case of an aircraft emergency;
  whereby the preponderance of the fuel on board the aircraft remains in the cooled state until needed by the aircraft engine, and the combustibility of the remaining portion of the fuel is reduced in the event of an aircraft emergency.

9. The method defined in claim 8, the step of maintaining the fuel at a reduced temperature includes the step of cooling the fuel by adding a pressurized material selected from the group consisting of liquid nitrogen, liquid carbon dioxide, solid carbon dioxide and a liquid noble element from Group VIII of the Periodic Table.

10. The method defined in claim 8, wherein said portion of the fuel is heated by means selected from the group consisting of electrical heating elements, electromagnetic energy, heat exchange with engine oil, heat exchange with engine exhaust and heat exchange with ambient air.

11. The method defined in claim 8, wherein said step of rapidly cooling includes injecting a cooling liquid into said portion of fuel.

12. The method defined in claim 8, wherein the step of maintaining the fuel on board the aircraft at a reduced temperature includes cooling the fuel to a temperature between its freezing temperature and a temperature about 25° above its freezing temperature to reduce its combustibility while the fuel remains a liquid.

13. The method defined in claim 8, wherein the step of maintaining the fuel on board the aircraft at a reduced temperature includes cooling the fuel to a temperature between its freezing temperature and a temperature about 10° above its freezing temperature to reduce its combustibility while the fuel remains a liquid.

14. The method defined in claim 8, wherein the step of maintaining the fuel on board the aircraft at a reduced temperature includes cooling the fuel to about its freezing temperature to reduce its combustibility while the fuel remains a liquid.

* * * * *